Patented May 30, 1933

1,911,399

UNITED STATES PATENT OFFICE

ARLIE W. SCHORGER, OF MADISON, WISCONSIN, ASSIGNOR TO C. F. BURGESS LABORATORIES, INC., OF MADISON, WISCONSIN, A CORPORATION OF DELAWARE

FERMENTATION PROCESS

No Drawing.      Application filed August 9, 1930. Serial No. 474,300.

This invention relates to improvements in the fermentation of sugars for the production of acetone and alcohols, particularly butyl alcohol. The invention enables high yields of butyl alcohol and acetone to be obtained from concentrated sugar solutions, and especially from cane or beet molasses in the form of concentrated solutions in a minimum fermentation time. The method claimed and described herein is an improvement over that described in the application of Jan A. Viljoen, Serial Number 370,146, filed June 11, 1929.

In the Viljoen application methods are described whereby a high yield of alcohols and acetone is obtained from strong sugar or molasses solutions. A large volume of starter in which the bacteria are at or near their highest possible concentration per unit of volume and at their proper physiological condition, is added to a strong sugar or molasses mash to form the inoculated final mash. The large number of Clostridia are obtained by having the volume of the starter equal to and preferably greater than the volume of the strong mash to which it is added. The concentration of sugar in the starter mash is comparatively low as compared to the concentration of sugar in either the inoculated final mash or the strong mash. This is necessary since the starter mash is inoculated in the usual way, that is, a comparatively small volume of inoculum is added to the starter mash. With a concentration greater than 3% of sugar the Clostridia will not grow vigorously enough under these conditions of inoculation. That application also describes the method of adding the strong mash slowly to the starter over a period of about 24 hours to produce the highest yields. A method for securing the proper buffering action to prevent the accumulation of a lethal quantity of organic acid during the fermentation is also described. Oil free proteolyzable protein, such a soya bean meal, is added to the starter mash in a quantity equal to the protein content of an equivalent corn meal mash. The fermentation in the starter mash hydrolyzes this protein to form a buffer nitrogen which, when the starter is added to the strong mash to form the inoculated final mash, properly buffers the organic acids which are formed by the organism.

I have discovered methods of improving upon those disclosed in the above application so that the yields of solvents are increased to above 35% of the total sugars present and in some cases reach to about 40% of the total sugars present. My improved methods also cut down the time of fermentation so that it is often less than 48 hours after the inoculation of the starter mash, though I consider the result satisfactory if the fermentation is completed within 72 hours after starting to add the strong mash to the starter. Apparently molasses is not always deficient in buffer nitrogen but it is usually deficient in available nitrogen and I have found how to supply this deficiency. Due to the complicated nature of the molasses solution it is difficult to determine the exact reason why my improved method functions to produce high yields.

The following terms and definitions are employed throughout this specification: "starter mash"—the mash before inoculation and which after inoculation and fermentation produces the starter; "starter"—the starter mash which has fermented to the point where it is ready to be added to the strong mash to produce the final fermentation; "heavy or strong mash"—the strong solution of molasses which is added to the starter to produce the inoculated final mash; "final mash" or "inoculated mash"—the combination of the strong mash and starter which upon completion of fermentation produces the final beer; "beer" or "final beer"—the solution resulting from the final fermentation of the inoculated final mash which contains the solvents.

I have found that if oil free protein such as soya bean meal, linseed meal or animal protein is hydrolyzed, as by prolonged cooking under pressure, or by means of an acid, such as sulphuric acid, and the resulting soluble compounds are added to the inoculated final mash or to the starter mash, or both, and the procedure outlined in the Viljoen application followed, an appreciably higher yield is produced than when the oil free protein is added to the starter mash. I have also found that the protein may be hydrolyzed by means of the organism itself as will be described hereinafter. The soluble hydrolyzed protein is then added to the starter mash or to the final inoculated mash. I have also found that the hydrolyzed protein may be replaced by ammonium salts such as ammonium sulfate, ammonium acetate, ammonium phosphate and the like. I do not offer an explanation of this result. It has been suggested that there is an exchange of radicals between the ammonium salt and the alkali organic compounds in the molasses to produce ammonium organic compounds, which are similar to the hydrolyzed proteins and may act as buffers.

The source of the carbohydrate fermented in the present process is one of the cheaper forms of sugar. Blackstrap molasses is available in large amounts and at low cost and is well suited for use in the present process. The molasses may be either from cane sugar or from beet sugar production. Raw sugar juices from other sources or sugars from other sources, such as fructose made from inulin of dahlia bulbs or sugars from the hydrolysis of cellulose, may be employed. The different raw materials require in some cases a slightly altered procedure but in general the method is not fundamentally altered.

The sugar solutions or suspensions fermented in the present process may be solutions of high concentration, comparable with or higher than the carbohydrate content of corn or maize solutions heretofore commonly fermented. Solutions containing from 8% to 14% or higher of blackstrap molasses in the final composite fermenting solutions can be fermented. The methods described in this application produce a final beer which is high in its content of solvents. The percentage of sugar in blackstrap molasses may vary from 40% to 60% but it is assumed to be an average of about 50% sugar, so that the final composite fermenting solution is one equivalent to a sugar content of around 4% to 7% or higher of sugar to produce a high solvent concentration if the process is carried out according to one of the methods of my invention. My process is especially adaptable to those solutions containing from 5% to 7% and possibly higher of sugars. This method as hereinafter described may be so modified that the sugar concentration in the final fermenting mash is kept low, but the solvents concentration in the final beer is high. I consider a fermentation effective if there results a high yield of solvents of at least 30% of the total sugars present. Usually there is left unfermented a concentration of not more than about one-half pound of sugar for one hundred pounds of final mash. It is well known to those skilled in the art that molasses contains a small amount of unfermentable sugar such as glutose. In an effective fermentation practically all of the fermentable sugar is changed into solvents, carbon-dioxide and hydrogen, the solvents usually being in the ratio of about five of butyl alcohol, two to two and one-half of acetone and one of ethyl alcohol.

It has heretofore been possible to ferment to completion very dilute molasses solutions containing less than about 3% of sugar and produce therefrom butyl alcohol and acetone by inoculating such dilute solutions with a small volume of a corn meal starter solution; but the dilution of the molasses solution greatly increases the evaporation cost in recovering the volatile end products, counterbalancing the saving in cost of raw materials. The excessive dilution of such molasses solutions makes the process uneconomical to operate in competition with the fermentation of maize, because of various losses and the high evaporating and concentrating costs.

The present invention provides an improved method by which it is possible to ferment solutions of high sugar content with high yields of volatile solvents and with the production of fermented solutions comparable in content of solvents with solutions heretofore produced by the fermentation of corn, so that the amount of evaporation required per pound of solvents recovered is no greater than, and usually less than that in the case of corn fermentation.

The invention is illustrated further by the following more detailed examples, but it is intended and is understood that the invention is not limited thereto.

According to one method of carrying out the invention a solution of fermenting maize is employed as the starter. It is possible to secure a vigorous growth of the fermenting organism or Clostridia, which I will refer to as *Clostridium acetobutylicum*, in a maize suspension. The name "*Clostridium acetobutylicum*" employed in the specification and claims is not intended to designate any single organism but is used to identify the group of related organisms capable of forming Clostridia and which are capable of fermenting fermentable solutions to produce butyl alcohol and acetone. A large volume of the fermenting maize is added to the concentrated sugar containing solution to thereby obtain the necessary bacterial mass attack to ferment the sugars. I term the action of the Clostridia when present in large numbers "bacterial mass attack" meaning thereby that an excessive number of Clostridia is present as compared with ordinary methods of fermentation. The fermentation takes place in strong sugar solutions for the production of butyl alcohol, etc. As a specific example 5,000 cubic centimeters of a 3% corn meal suspension are inoculated and allowed to ferment at 30° C. to 38° C. until the Clostridia are at or near their maximum concentration. This fermenting solution is called the starter. I prefer to use a temperature of 35° C. to 38° C. or an average of 37° C. This takes about 24 to 30 hours after inoculation if grown at 32° C. and but about 9 hours at 37° C. This starter is then mixed with about 5,000 cubic centimeters of a solution or strong mash of 20% of cane or beet molasses (10% of sugar) to form the inoculated final mash. Although the corn meal of this starter suspension contains sufficient protein, which after being hydrolyzed during the fermentation to produce the starter, produces a good yield of solvents from the molasses in the inoculated final mash, this yield may be increased several per cent if the fermentation is carried out in accordance with my invention, that is, by carrying on the final fermentation in the presence of added hydrolyzed protein or added ammonium salts, such as ammonium sulfate, ammonium phosphate, ammonium acetate and the like. Accordingly the inoculated final mash, as produced above by the addition of the starter (produced from the corn meal) to the molasses strong mash, should ferment in the presence of such added hydrolyzed protein or added ammonium salts. These need not be introduced into the inoculated final mash but may be introduced into either the starter mash or into the strong mash or into both or these may be introduced into the inoculated final mash during or soon after the mixing of the strong mash and starter has taken place provided that the strong mash is not added slowly to the starter. As a specific example about 5 grams of ammonium sulfate in the amount of inoculated final mash given above gives excellent results. This amount usually may be varied from 2 to 11 grams depending upon the molasses. It is obvious that the nitrogen content of the molasses is an important factor in determining the amount of added nitrogen containing material. Both the corn meal suspension or mash, which ferments to form the starter, and the strong mash of molasses, preferably are sterilized sufficiently to kill all yeasts and all the non-spore forming lactic-acid-producing bacteria. This may be done by bringing these mashes to about boiling. The best result, that is, the highest yield of solvents in the shortest time, may be obtained by adding the strong molasses mash slowly to the starter after the bacilli are at or near the highest possible concentration per unit of volume in the starter. The strong mash is added over a period of about 24 hours, though this may vary over a considerable range of time depending upon several factors such as the temperature and the raw materials used. Under these conditions the fermentation is usually finished in less than 72 hours and occasionally in 36 hours from the time that the starter mash is first inoculated, provided that the fermentation is carried on at about 37° C. At about 32° C. the fermentation time may be from 6 to 9 days. The amount of corn meal in the starter mash before mixing with the final mash may be varied, usually being between 2% and 5%. Suspensions of corn meal employed for fermenting are frequently referred to as "solutions" in the art.

The hydrolyzed protein referred to above may be prepared as follows: 30 parts by weight of fat-free protein, such as soya bean meal, and 200 parts by weight of a 3% sulphuric acid, hydrochloric acid, or any other suitable acid are heated in an autoclave for one hour at 15 lbs. steam pressure. The remaining acid is then neutralized with milk of lime and the material filtered through fuller's earth. This amount is sufficient for fermenting 1,000 parts by weight of molasses in 10,000 parts of final mash. The same result may be obtained by boiling the protein in water containing 3% of the acid used for four hours. In calculating equivalent amounts of ammonium salts and hydrolyzed proteins the nitrogen content of the ammonium salts and the protein prior to hydrolysis are used for comparison.

The hydrolyzed protein may also be obtained by bacterial action using *Clostridium acetobutylicum* as the fermenting organism. As a specific example, 20 to 40 parts by weight, preferably 30 parts of fat-free protein, such as soya bean meal, are added to 200 parts of a 3% to 4% molasses and the mixture sterilized and inoculated with 20 parts of a 24 hour culture of *Clostridium acetobutylicum* in a 5% corn mean mash. The material is incubated at 37° C. for 48 hours and then filtered through fuller's earth. The soluble portion is used. This is enough to ferment 1,000 parts of molasses in 10,000 parts of final mash. The hydrolyzed protein may also be in the form of a water soluble nitrogenous product of animal origin made by hydrolyzing packing house refuse, such as horns, hide, hair, hoofs, ligaments, tendons and similar materials.

By using a starter made from some sugar solution, such as molasses, instead of a corn meal suspension, the cost of the process may be materially reduced. In addition the use of a molasses starter apparently has a tendency to increase the speed of fermentation which is highly desirable.

Following is an example of a fermentation made in accordance with my invention in which the ammonium salt is divided between the starter mash and strong mash and in which a molasses starter is used: 250 grams by weight of molasses (containing 50% sugars) are made up with water to 6,500 cc.; 1 gram of ammonium sulfate is added to this solution which is sterilized sufficiently to kill all yeasts and non-spore forming lactic acid producing bacteria. This solution or starter mash after cooling is inoculated with 500 cc. of a 24 hour culture of *Clostridium acetobutylicum* grown in 5% corn meal mash. This is incubated at 35° to 38° C. from 7 to 12 hours, preferably about 8 hours thereby producing the starter in which the Clostridia are at or near their highest possible concentration per unit of volume. The strong or heavy mash which is added to this starter at the end of this period of time, is made by diluting 950 grams of the molasses with water to 3,000 cc., adding 4 grams of ammonium sulfate, and preferably sterilizing as described. Although the heavy mash may be added all at once to the starter at the end of the 8 hour period, I prefer to add it slowly so that it is run in over a period of about 12 to 36 hours, usually about 24 hours, although this period may vary considerably. The inoculated final mash after all of the strong mash is added, would have had a concentration of about 6 per cent of sugar if the strong mash had been added at one time. By running in the strong mash slowly, it is probable that the sugar level is maintained more or less evenly in the inoculated final mash so that the Clostridia are not subjected to varying concentrations of sugar. This method is more dependable, gives somewhat higher yields, and the fermentation time is shorter. Hydrolyzed protein may be substituted for the ammonium salts. As in the case of the fermentation inoculated by a corn meal starter, the ammonium salt or hydrolyzed protein is preferably added proportionately to both the starter mash and strong mash, although it may be added entirely either to the strong molasses mash or the starter mash, or it may be added entirely to the inoculated final mash provided that the strong mash is added at one time to the starter.

It is desirable to keep the acid concentration or pH value of the inoculated final mash confined within narrow limits, usually between 4.4 to 4.8. The starter mash may contain from 1% to 3% of sugars and usually contains less than 3%. With higher concentrations of sugar the bacterial growth is not as vigorous. In order to obtain the necessary bacterial mass attack it is desirable to have the volume of the starter greater than that of the strong mash. I prefer a volume ratio of about 1½ times to 4 times and usually about three times that of the strong mash. The sugar content by weight of the strong mash is usually considerably larger than that of the starter mash. A favorable ratio is from 3 to 5 times that of the starter mash. The amount of hydrolyzed protein or ammonium salts which has to be added, of course, varies with the type of molasses which is being fermented. Where sugars other than molasses are being fermented the amount of these materials which are added may have to be varied considerably. For the ordinary blackstrap molasses I have found that 5 to 25 grams of ammonium salts per thousand grams of sugar subject to fermentation represents about the limit. With one type of Cuban blackstrap molasses 10 to 15 grams of ammonium sulfate gave excellent results. At an incubating temperature of about 37° C. the starter mash may ferment about 7 to 12 hours and usually about 8 hours, at which time the Clostridia are at or near their greatest concentration. At this point about 25% to 40% of the sugars which were present in the starter mash have fermented. In a specific instance 33% was fermented. Data on the acid concentration of the starter indicate that the Clostridia are at their greatest concentration and their correct physiological state when the pH of the starter is about 4.7 though this varies somewhat with conditions. When the starter mash is first inoculated, it has a pH of above 5.0 but this gradually decreases with the fermentation time. If the fermentation continues below about a pH of 4.7, the acid concentration increases to such a degree that the starter becomes toxic to the Clostridia and decreases their vigor.

The solvents are distilled from the final beer in the usual way well known to those skilled in the art.

The volumes given in the above example are approximate only because it is difficult to control them accurately because of evaporation, condensation and fermentation volume changes. The times given for the various operations also may vary considerably over those given. Unless specifically stated the times given are for fermentations carried on at about 37° C. or about 35° C. to 38° C., the optimum temperature. It is understood that for other temperatures the times vary accordingly.

In the preceding example the corn meal seed culture is removed but one step from the inoculated final mash. Instead of adding the molasses or a sugar starter produced as above described, to the strong sugar or molasses mash, I have found that the starter may be added to another 4% molasses mash in the volume ratio of about 1 to 10 as with the first starter mash. When this second inoculated 4% molasses reaches or approximates its maximum growth of organisms it is used as a starter and is mixed with the strong molasses mash to form the inoculated final mash in the necessary proportion to secure bacterial mass attack as described. The hydrolyzed protein or ammonium salts may be introduced in the usual way with a small amount being introduced into the first starter mash. This method introduces but a negligible amount of corn meal into the inoculated final mash.

The number of bacteria which it is necessary to add to secure the necessary bacterial mass attack increases much more rapidly than the concentration of sugar. With still stronger concentrations of sugar, the conversion to butyl alcohol and acetone apparently drops due to the presence of the large quantity of these solvents which apparently affect the Clostridia.

Molasses although deficient in sufficient available nitrogen to give the highest yields of solvents nevertheless contains some organic compounds which are available to the organism. Sugar solutions which are practically free of nitrogen can not be used to give good results if ammonium salts alone are used. Hydrolyzed protein must be used or a mixture of a protein material, such as soya bean meal and the ammonium salts, must be used in the proper proportion. Too much of these materials is as harmful as too little.

Care must be used in sterilizing the solutions. By too prolonged cooking or cooking at too high a temperature toxic materials are formed apparently by the heat. This toxicity may be due to caramelization of the sugar. I prefer bringing the sugar mashes to a boil for a few minutes and then cooling rapidly to prevent any caramelization due to the long exposure to heat which results when large volumes of liquid are cooled by allowing them to remain quiet in large tanks. The injection of live steam under high pressure into the mash also seems to be detrimental, apparently because of local overheating of the mash. The best methods for heating seem to be by coils or jacketed kettles. A method which gives excellent results is to first bring the diluting water for the heavy, as received, molasses to a boil in any convenient way and then boil with steam jacket or any other indirect way while the heavy molasses is added.

In large scale operations the heat generated during the fermentation in large fermenters is sufficient to heat the fermenting mash to well above 38° C. or temperatures which are harmful. It is the usual practice to prevent this rise in temperature by running cooling water over the outside of the fermenters. However, the cooling is usually localized to the fermenting mash adjacent the walls by this method and the central mass of this fermenting mash rises above 38° C. The temperature of the fermenting inoculated final mash may be effectively controlled and kept at about 38° C. throughout by running in the strong mash at a temperature several degrees below 38° C., usually about 31° C. to 33° C., depending upon the conditions. The temperature of the fermenting inoculated final mash is thereby controlled during the period of the slow addition of the strong mash so that the entire volume remains at 38° C. or the desired temperature.

Where the percent of sugar is specified the sugar is expressed in terms of glucose as is usually done in the art.

Where it is stated that the combined strong mash and starter are allowed to ferment to completion in the presence of sufficient added ammonium salt or the hydrolyzed protein, these materials may be added either to the starter or to the strong mash or they may be divided among these as desired, or they may be added to the inoculated final mash in proportion to the amount of sugar being added in the strong mash.

Although the mashes preferably are sterilized, it is not necessary to sterilize the entire volume of mash if make-up water of sufficient sterility is available. In such cases the partially diluted raw molasses is sterilized and the cold pure water added to make the desired mash. This procedure saves time and the expense of heating a large volume of mash. Throughout the specification where sterilization of the mashes is indicated by heating I contemplate covering both the sterilization of the entire volume of mash and the sterilizing of the molasses or sugar solution with the later addition of water of sufficient sterility to make up the mash.

In the above description my improved method has been described in connection with molasses and other natural sugar juices containing nitrogenous material and especially proteins which may supply the necessary available nitrogen for the organism and the necessary nitrogenous compounds for buffering the solution. When the molasses or sugar juices are deficient in nitrogen this nitrogen may best be supplied by means of ammonium salts or hydrolyzed proteins as described, the ammonium salts apparently being available as a source of nitrogen thereby leaving the natural proteins available as buffer forming materials. When pure sugars which contain no or practically no proteins or similar nitrogenous material are used it is not sufficient to add the ammonium salts alone. Although the nitrogen of these salts is available to the Clostridia they apparently can not form buffers from them if these salts alone are present. It is therefore necessary to also add proteins, which may first be hydrolyzed, to such pure sugar solutions to which ammonium salts are added, so that the proper buffering action takes place.

I claim:

1. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of 1% to 3% of sugars and a volume of 1½ times to 4 times that of the strong mash the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, inoculating said starter mash with said Clostridia, allowing said starter mash to ferment until said Clostridia have fermented about 25% to 40% of the sugars present to produce the starter, thereupon slowly adding said strong mash over a period of from 12 to 36 hours to said starter, and allowing the combined strong mash and starter to ferment to completion, the fermentation being carried on in the presence of 5 to 25 grams of ammonium sulphate per 1,000 grams of sugar in the combined mashes.

2. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of 1% to 3% of sugars and a volume of 1½ times to 4 times that of the strong mash the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, inoculating said starter mash with said Clostridia, allowing said starter mash to ferment until said Clostridia have fermented about 25% to 40% of the sugars present to produce the starter, thereupon slowly adding said strong mash over a period of from 12 to 36 hours to said starter, and allowing the combined strong mash and starter to ferment to completion, the fermentation being carried on in the presence of 5 to 25 grams of ammonium phosphate per 1,000 grams of sugar in the combined mashes.

3. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of 1% to 3% of sugars and a volume of 1½ times to 4 times that of the strong mash, the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, inoculating said starter mash with said Clostridia, allowing said starter mash to ferment until said Clostridia have fermented about 25% to 40% of the sugars present to produce the starter, thereupon slowly adding said strong mash over a period of from 12 to 36 hours to said starter, and allowing the combined strong mash and starter to ferment to completion, the fermentation being carried on in the presence of 5 to 25 grams of ammonium acetate per 1,000 grams of sugar in the combined mashes.

4. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of 1% to 3% of sugars and a volume of 1½ times to 4 times that of said strong mash, the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, inoculating said starter mash with said Clostridia, allowing said starter mash to ferment until said Clostridia have fermented about 25% to 40% of the sugars present to produce the starter, thereupon slowly adding said strong mash to said starter at a rate sufficient to maintain the sugar level of the fermenting mixture, and allowing the combined strong mash and starter to ferment to completion, the fermentation being carried on in the presence of 5 to 25 grams of an ammonium salt per 1,000 grams of sugar in the combined mashes.

5. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of 1% to 3% of sugars and a volume of 1½ times to 4 times that of the strong mash, the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, inoculating said starter mash with said Clostridia allowing said starter mash to ferment until said Clostridia are at or near their highest possible concentration per unit of volume to produce the starter, thereupon slowly adding said strong mash to said starter, and allowing the combined strong and starter mash to ferment to completion, the fermentation being carried on in the presence of 5 to 25 grams of an ammonium salt per 1,000 grams of sugar in the combined mashes.

6. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of less than about 3% of sugars and a volume greater than that of the strong mash, the concentration of said strong mash being such that the molasses solution which would result if said mashes were combined would contain about 5 per cent to 7 per cent of sugars, sterilizing said starter mash and strong mash by bringing them to a temperature sufficient to boil them at atmospheric pressure, inoculating said starter mash with said Clostridia, allowing said starter mash to ferment until the pH thereof is about 4.7 to produce the starter thereupon slowly adding said strong mash over a period of from 12 to 36 hours to said starter, and allowing the combined strong mash and starter to ferment to completion, the fermentation being carried on in the presence of 5 to 25 grams of an added ammonium salt per 1,000 grams of sugar in the combined mashes.

7. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said mashes when combined producing said final mash. said starter mash having a concentration of less than about 3% of sugars and a volume greater than that of the strong mash the concentration of said strong mash being such that the molasses solution which would result if said mashes were combined would contain about 5 per cent to 7 per cent of sugars, inoculating said starter mash with said Clostridia, allowing said starter mash to ferment until said Clostridia are at or near their highest possible concentration per unit of volume to produce the starter, thereupon slowly adding said strong mash to said starter and allowing the combined strong mash and starter to ferment to completion, the fermentation being carried on in the presence of 5 to 25 grams of an added ammonium salt per 1,000 grams of sugar in the combined mashes.

8. The process of producing a high yield of alcohols and acetone by the fermentation with *Clostridium acetobutylicum* of a proteinaceous sugar material deficient in nitrogen for said high yield fermentation, which comprises preparing a weak starter mash and a strong mash of said sugar material, said starter mash having a concentration of less than about 3% of sugars and a volume greater than that of the strong mash the concentration of said strong mash being such that the sugar solution which would result if the said two mashes were combined would contain about 5 per cent to 7 per cent of sugars, sterilizing said starter mash and strong mash by cooking sufficiently to kill the yeasts and non-spore forming lactic acid producing bacteria, inoculating said starter mash with said Clostridia, allowing said starter mash to ferment until said Clostridia are at or near their highest possible concentration per unit of volume to produce the starter, thereupon adding said strong mash to said starter, and allowing the combined strong mash and starter to ferment to completion, the fermentation being carried on in the presence of sufficient added ammonium salt to make up said nitrogen deficiency to produce said high yield of alcohols and acetone.

9. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, the sugar content by weight of said strong mash being from 3 to 5 times that of said starter mash, said starter mash having a concentration of less than about 3% of sugars and a volume greater than that of the strong mash the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic-acid-producing bacteria, inoculating said starter mash with said Clostridia, allowing said starter mash to ferment until said Clostridia are at or near their highest possible concentration per unit of volume to produce the starter, thereupon adding said strong mash to said starter, and allowing the combined strong mash and starter to ferment to completion, the fermentation being carried on in the presence of sufficient added ammonium salt to make up for said nitrogen deficiency to produce said high yield of alcohols and acetone.

10. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said strong mash having a sugar content by weight several times that of said starter mash, said starter mash having a concentration of less than about 3% of sugars and a volume greater than that of said strong mash the concentration of said strong mash being such that the molasses solution which would result if said mashes were combined would contain about 5 per cent to 7 per cent of sugars, heating said starter mash and strong mash to or near their boiling point, inoculating said starter mash with said Clostridia, allowing said starter mash to ferment for 7 to 12 hours until said Clostridia are at or near their highest possible concentration per unit of volume to produce the starter, thereupon slowly adding said strong mash to said starter, and allowing the combined strong mash and starter to ferment to completion, the fermentation being carried on in the presence of sufficient added ammonium salt to make up for said nitrogen deficiency to produce said high yield of alcohols and acetone.

11. The process of producing a high yield of alcohols and acetone by the fermentation with *Clostridium acetobutylicum* of a proteinaceous sugar material deficient in nitrogen for said high yield fermentation, which comprises preparing a weak starter mash and a strong mash of said sugar material, said starter mash having a concentration of less than about 3% of sugars and a volume greater than that of said strong mash the concentration of said strong mash being such that the sugar solution which would result if the said two mashes were combined would contain about 5 per cent to 7 per cent of sugars, inoculating said starter mash with said Clostridia, allowing said starter mash to ferment until said Clostridia are at or near their highest possible concentration per unit of volume to produce the starter, thereupon adding said strong mash to said starter, and allowing the combined strong mash and starter to ferment to completion, the fermentation being carried on in the presence of sufficient added nitrogen to make up for said nitrogen deficiency in the form of a nitrogenous material selected from the group consisting of ammonium salts and hydrolyzed proteins to produce said high yield of alcohols and acetone.

12. The process of producing a high yield of alcohols and acetone by the fermentation with *Clostridium acetobutylicum* of a proteinaceous sugar material deficient in nitrogen for said high yield fermentation, which comprises preparing a weak starter mash and a strong mash of said sugar material, said starter mash having a concentration of less than about 3% of sugars and a volume greater than that of said strong mash the concentration of said strong mash being such that the sugar solution which would result if the said two mashes were combined would contain about 5 per cent to 7 per cent of sugars, inoculating said starter mash with said Clostridia, allowing said starter mash to ferment until said Clostridia are at or near their highest possible concentration per unit of volume to produce the starter, thereupon slowly adding said strong mash to said starter, and allowing the combined strong mash and starter to ferment to completion, the fermentation being carried on in the presence of sufficient added hydrolyzed protein to make up for said nitrogen deficiency to produce said high yield of alcohols and acetone.

13. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, said starter mash having a concentration of less than about 3% of sugars and a volume greater than that of said strong mash the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, adding to said starter mash an amount of hydrolyzed protein to make up the deficiency of nitrogen therein, inoculating said starter mash with said Clostridia, allowing said starter mash to ferment until said Clostridia are at or near their highest possible concentration per unit of volume to produce the starter, thereupon slowly adding said strong mash to said starter, and allowing the combined strong mash and starter to ferment to completion, the fermentation being carried on in the presence of additional hydrolyzed protein in an amount sufficient to make up the deficiency in the strong mash to produce said high yield of alcohols and acetone in the final fermentation.

14. The process of producing a high yield of alcohols and acetone by the fermentation with *Clostridium acetobutylicum* of a molasses deficient in nitrogen for said high yield fermentation, which comprises preparing a starter mash comprising a corn meal suspension, preparing a strong mash of said molasses, said starter mash having a volume greater than that of said strong mash the concentration of said strong mash being such that the molasses solution which would result if said mashes were combined would contain about 5 per cent to 7 per cent of sugars, sterilizing said starter mash and strong mash by cooking sufficiently to kill the yeasts and non-spore forming lactic acid producing bacteria, adding to said strong mash from 5 to 25 grams of an ammonium salt per 1,000 grams of sugar therein, inoculating said starter mash with said Clostridia, allowing said starter mash to ferment until said Clostridia are at or near their highest concentration per unit of volume to produce the starter, thereupon slowly adding said strong mash to said starter over a period of at least several hours, and allowing the combined strong mash and starter to ferment to completion.

15. The process of producing a high yield of alcohols and acetone by the fermentation with *Clostridium acetobutylicum* of a proteinaceous sugar material deficient in nitrogen for said high yield fermentation, which comprises preparing a starter mash comprising a corn meal suspension and a strong mash of said sugar material, said starter mash having a volume greater than that of said strong sugar mash the concentration of said strong mash being such that the sugar solution which would result if the said two mashes were combined would contain about 5 per cent to 7 per cent of sugars, inoculating said starter mash with said Clostridia, allowing said starter mash to ferment until said Clostridia are at or near their highest possible concentration per unit of volume to produce the starter, thereupon adding said strong mash to said starter, and allowing the combined strong mash and starter to ferment to completion, the fermentation being carried on in the presence of sufficient added available nitrogen to make up for said nitrogen deficiency in the form of a nitrogenous material selected from the group consisting of ammonium salts and hydrolyzed proteins to produce said high yield of alcohols and acetone.

16. The process of producing a high yield of alcohols and acetone by the fermentation with *Clostridium acetobutylicum* of a proteinaceous sugar material deficient in nitrogen for said high yield fermentation, which comprises preparing a weak starter mash and a strong mash of said sugar material, said starter mash having a concentration of substantially less than 5% of sugars and a volume greater than that of said strong mash the concentration of said strong mash being such that the sugar solution which would result if the said two mashes were combined would contain about 5 per cent to 7 per cent of sugars, inoculating said starter mash with said Clostridia, allowing said starter mash to ferment until said Clostridia are at or near their highest possible concentration per unit of volume to produce the starter, mixing said starter with said strong mash and allowing the combined strong mash and starter to ferment to completion, the fermentation being carried on in the presence of sufficient added nitrogen to make up for said nitrogen deficiency in the form of a nitrogenous material selected from the group consisting of ammonium salts and hydrolyzed proteins to produce said high yield of alcohols and acetone.

17. The process of producing a high yield of alcohols and acetone in about 72 hours or less by the fermentation with *Clostridium acetobutylicum* of a molasses deficient in nitrogen for said high yield fermentation, which comprises preparing a weak starter mash and a strong mash of said molasses, said starter mash having a concentration of substantially less than 5% of sugars and a volume greater than that of said strong mash the concentration of said strong mash being such that the molasses solution which would result if the said two mashes were combined would contain at least 5 per cent of sugars, inoculating said starter mash with said Clostridia, allowing said starter mash to ferment until said Clostridia are at or near their highest possible concentration per unit of volume to produce the starter, slowly adding said strong mash to said starter, and allowing the combined strong mash and starter to ferment to completion, the fermentation being carried on in the presence of sufficient added nitrogen to make up for said nitrogen deficiency in the form of a nitrogenous material selected from the group consisting of ammonium salts and hydrolyzed proteins to produce said high yield of alcohols and acetone.

18. The method of preparing soluble nitrogen suitable for adding to a sugar mash being fermented, which comprises making a sterilized suspension in the ratio of about 20 to 40 parts by weight of protein in about 200 parts by weight of about a 3% to 4% molasses solution, inoculating said suspension with *Clostridium acetobutylicum* and allowing it to ferment, and filtering off the insoluble material.

19. A soluble nitrogen suitable for adding to a sugar mash to be fermented, which comprises the soluble portion of a sterilized suspension in the ratio of about 20 to 40 parts by weight of protein material in about 200 parts by weight of about a 3% to 4% molasses solution fermented by *Clostridium acetobutylicum*.

20. In the herein-described process of fermenting a sugar mash with *Clostridium acetobutylicum* at a temperature of about 35° to 38° C., the method for preventing an inoculated final mash from overheating which comprises running a strong mash slowly into a starter while maintaining said strong mash running into said starter at a temperature sufficiently below that of the inoculated final mash to keep said inoculated final mash at the desired fermenting temperature.

21. The process of producing a high yield of alcohols and acetone by the fermentation with *Clostridium acetobutylicum* of a molasses deficient in nitrogen for said high yield fermentation, which comprises preparing a weak starter mash and a strong mash of said molasses, the sugar content by weight of said strong mash being from 3 to 5 times that of said starter mash, said starter mash having a concentration of less than about 3% of sugars and a volume greater than that of said strong mash, the concentration of said strong mash being such that the molasses solution which would result if said mashes were combined would contain about 5 per cent to 7 per cent of sugars, adding to said starter mash from 1 to 5 grams of an ammonium salt per 1,000 grams of sugar in the combined mashes, sterilizing said starter mash and strong mash by cooking sufficiently to kill yeasts and non-spore forming lactic-acid-producing bacteria, inoculating said starter mash with said Clostridia, allowing said starter mash to ferment until the pH thereof is about 4.7 to produce the starter, thereupon slowly adding said strong mash to said starter, and allowing the combined strong mash and starter to ferment to completion, the fermentation being carried on in the presence of sufficient additional ammonium salt to produce said high yield of alcohols and acetone.

22. The process of producing a high yield of alcohols and acetone in about 72 hours or less by the fermentation with *Clostridium acetobutylicum* of a molasses deficient in nitrogen for said high yield fermentation, which comprises preparing a weak starter mash and a strong mash of said molasses, said starter mash having a concentration of substantially less than 5% of sugars and a volume greater than that of said strong mash, the concentration of said strong mash being such that the molasses solution which would result if the said two mashes were combined would contain at least 5 per cent of sugars, inoculating said starter mash with said Clostridia, allowing said starter mash to ferment until said Clostridia are at or near their highest possible concentration per unit of volume to produce the starter, slowly adding said strong mash to said starter, and allowing the combined strong mash and starter to ferment to completion, the fermentation being carried on in the presence of sufficient added nitrogen in the form of hydrolyzed protein to produce said high yield of alcohols and acetone.

23. The process of producing a high yield of alcohols and acetone in about 72 hours or less by the fermentation with *Clostridium acetobutylicum* of a molasses deficient in nitrogen for said high yield fermentation, which comprises preparing a weak starter mash and a strong mash of said molasses, said starter mash having a concentration of substantially less than 5% of sugars and a volume greater than that of said strong mash, the concentration of said strong mash being such that the molasses solution which would result if the said two mashes were combined would contain at least 5 per cent of sugars, inoculating said starter mash with said Clostridia, allowing said starter mash to ferment until the pH thereof is about 4.7 to produce the starter, slowly adding said strong mash to said starter, and allowing the combined strong mash and starter to ferment to completion, the fermentation being carried on in the presence of sufficient added nitrogen in the form of an ammonium salt divided proportionately to the sugar content between said starter mash and strong mash to produce said high yield of alcohols and acetone.

24. The process of producing a high yield of alcohols and acetone in about 72 hours or less by the fermentation with *Clostridium acetobutylicum* of a molasses deficient in nitrogen for said high yield fermentation, which comprises preparing a weak starter mash and a strong mash of said molasses, said starter mash having a concentration of substantially less than 5% of sugars and a volume greater than that of said strong mash, the concentration of said strong mash being such that the molasses solution which would result if the said two mashes were combined would contain at least 5 per cent of sugars, inoculating said starter mash with said Clostridia, allowing said starter mash to ferment until said Clostridia are at or near their highest possible concentration per unit of volume to produce the starter, slowly adding said strong mash while at a temperature several degrees below that of the inoculated final mash to said starter to keep said inoculated final mash at the desired temperature, and allowing the combined strong mash and starter to ferment to completion, the fermentation being carried on in the presence of sufficiently added nitrogen to make up for said nitrogen deficiency in the form of a nitrogenous material selected from the group consisting of ammonium salts and hydrolyzed proteins to produce said high yield of alcohols and acetone.

25. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until Clostridia have fermented at least 25% of the sugars present, mixing the resulting starter and said strong mash and allowing the resulting mash to ferment in the presence of added hydrolyzed protien until a yield of alcohols and acetone equivalent to at least 30% by weight of the total sugars in said starter mash and said strong mash has been obtained.

26. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until Clostridia have fermented at least 25% of the sugars present, mixing the resulting starter and said strong mash and allowing the resulting mash to ferment in the presence of added ammonium salts until a yield of alcohols and acetone equivalent to at least 30% by weight of the total sugars in said starter mash and said strong mash has been obtained.

27. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until Clostridia have fermented at least 25% of the sugars present, slowly adding said strong mash to the resulting starter and allowing the resulting mash to ferment in the presence of added hydrolyzed protein until a yield of alcohols and acetone equivalent to at least 35% by weight of the total sugars in said starter mash and said strong mash has been obtained.

28. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until Clostridia have fermented at least 25% of the sugars present, slowly adding said strong mash to the resulting starter and allowing the resulting mash to ferment in the presence of added ammonium salts until a yield of alcohols and acetone equivalent to at least 35% by weight of the total sugars in said starter mash and said strong mash has been obtained.

29. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until said Clostridia are at or near their highest possible concentration per unit of volume, mixing the resulting starter and said strong mash and allowing the resulting mash to ferment in the presence of added hydrolyzed protein until a yield of alcohols and acetone equivalent to at least 30% by weight of the total sugars in said starter mash and said strong mash has been obtained.

30. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until said Clostridia are at or near their highest possible concentration per unit of volume, mixing the resulting starter and said strong mash and allowing the resulting mash to ferment in the presence of added ammonium salts until a yield of alcohols and acetone equivalent to at least 30% by weight of the total sugars in said starter mash and said strong mash has been obtained.

31. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inoculation with a few of said Clostridia, sterilizing said starter mash and said strong mash to kill yeasts and non-spore forming lactic acid producing bacteria, inoculating said starter mash with said Clostridia, allowing said starter mash to ferment until said Clostridia are at or near their highest possible concentration per unit of volume, slowly adding said strong mash to the resulting starter and allowing the resutling mash to ferment in the presence of added hydrolyzed protein until a yield of alcohols and acetone equivalent to at least 35% by weight of the total sugars in said starter mash and said strong mash has been obtained.

32. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inocualtion with a few of said Clostridia, sterilizing said starter mash and said strong mash to kill yeasts and non-spore forming lactic acid producing bacteria, inoculating said starter mash with said Clostridia, allowing said starter mash to ferment until said Clostridia are at or near their highest possible concentration per unit of volume, slowly adding said strong mash to the resulting starter and allowing the resulting mash to ferment in the presence of added ammonium salts until a yield of alcohols and acetone equivalent to at least 35% by weight of the total sugars in said starter mash and said strong mash has been obtained.

In testimony whereof I affix my signature.

ARLIE W. SCHORGER.

---

CERTIFICATE OF CORRECTION.

Patent No. 1,911,399.  May 30, 1933.

ARLIE W. SCHORGER.

It is hereby certified that error appears in the printed specification of the above numbered patent requiring correction as follows: Page 6, line 129, claim 5, strike out the word "mash" and insert the same after "strong" in line 128; page 7, lines 37 and 38, claim 7, strike out the words and comma "said mashes when combined producing said final mash,"; page 12, line 4, claim 31, for "resutling" read "resulting"; and line 18, claim 32, for "inocualtion" read "inoculation"; and that the said Letters Patent should be read with these corrections therein that the same may conform to the record of the case in the Patent Office.

Signed and sealed this 15th day of August, A. D. 1933.

M. J. Moore.

(Seal)  Acting Commissioner of Patents.

are at or near their highest possible concentration per unit of volume, slowly adding said strong mash to the resulting starter and allowing the resutling mash to ferment in the presence of added hydrolyzed protein until a yield of alcohols and acetone equivalent to at least 35% by weight of the total sugars in said starter mash and said strong mash has been obtained.

32. The process of producing high yields of alcohols and acetone by the fermentation with *Clostridium acetobutylicum* of a molasses deficient in nitrogen for said high yield fermentation which comprises preparing a starter mash containing not more than about 3% sugar and a strong mash of such high sugar content that effective fermentation would not result from inocualtion with a few of said Clostridia, sterilizing said starter mash and said strong mash to kill yeasts and non-spore forming lactic acid producing bacteria, inoculating said starter mash with said Clostridia, allowing said starter mash to ferment until said Clostridia are at or near their highest possible concentration per unit of volume, slowly adding said strong mash to the resulting starter and allowing the resulting mash to ferment in the presence of added ammonium salts until a yield of alcohols and acetone equivalent to at least 35% by weight of the total sugars in said starter mash and said strong mash has been obtained.

In testimony whereof I affix my signature.

ARLIE W. SCHORGER.

CERTIFICATE OF CORRECTION.

Patent No. 1,911,399. May 30, 1933.

ARLIE W. SCHORGER.

It is hereby certified that error appears in the printed specification of the above numbered patent requiring correction as follows: Page 6, line 129, claim 5, strike out the word "mash" and insert the same after "strong" in line 128; page 7, lines 37 and 38, claim 7, strike out the words and comma "said mashes when combined producing said final mash,"; page 12, line 4, claim 31, for "resutling" read "resulting"; and line 18, claim 32, for "inocualtion" read "inoculation"; and that the said Letters Patent should be read with these corrections therein that the same may conform to the record of the case in the Patent Office.

Signed and sealed this 15th day of August, A. D. 1933.

M. J. Moore.

(Seal) Acting Commissioner of Patents.

CERTIFICATE OF CORRECTION.

Patent No. 1,911,399.  May 30, 1933.

ARLIE W. SCHORGER.

It is hereby certified that error appears in the printed specification of the above numbered patent requiring correction as follows: Page 6, line 129, claim 5, strike out the word "mash" and insert the same after "strong" in line 128; page 7, lines 37 and 38, claim 7, strike out the words and comma "said mashes when combined producing said final mash,"; page 12, line 4, claim 31, for "resutling" read "resulting"; and line 18, claim 32, for "inocualtion" read "inoculation"; and that the said Letters Patent should be read with these corrections therein that the same may conform to the record of the case in the Patent Office.

Signed and sealed this 15th day of August, A. D. 1933.

M. J. Moore.

(Seal)   Acting Commissioner of Patents.